United States Patent Office 3,212,515
Patented Oct. 19, 1965

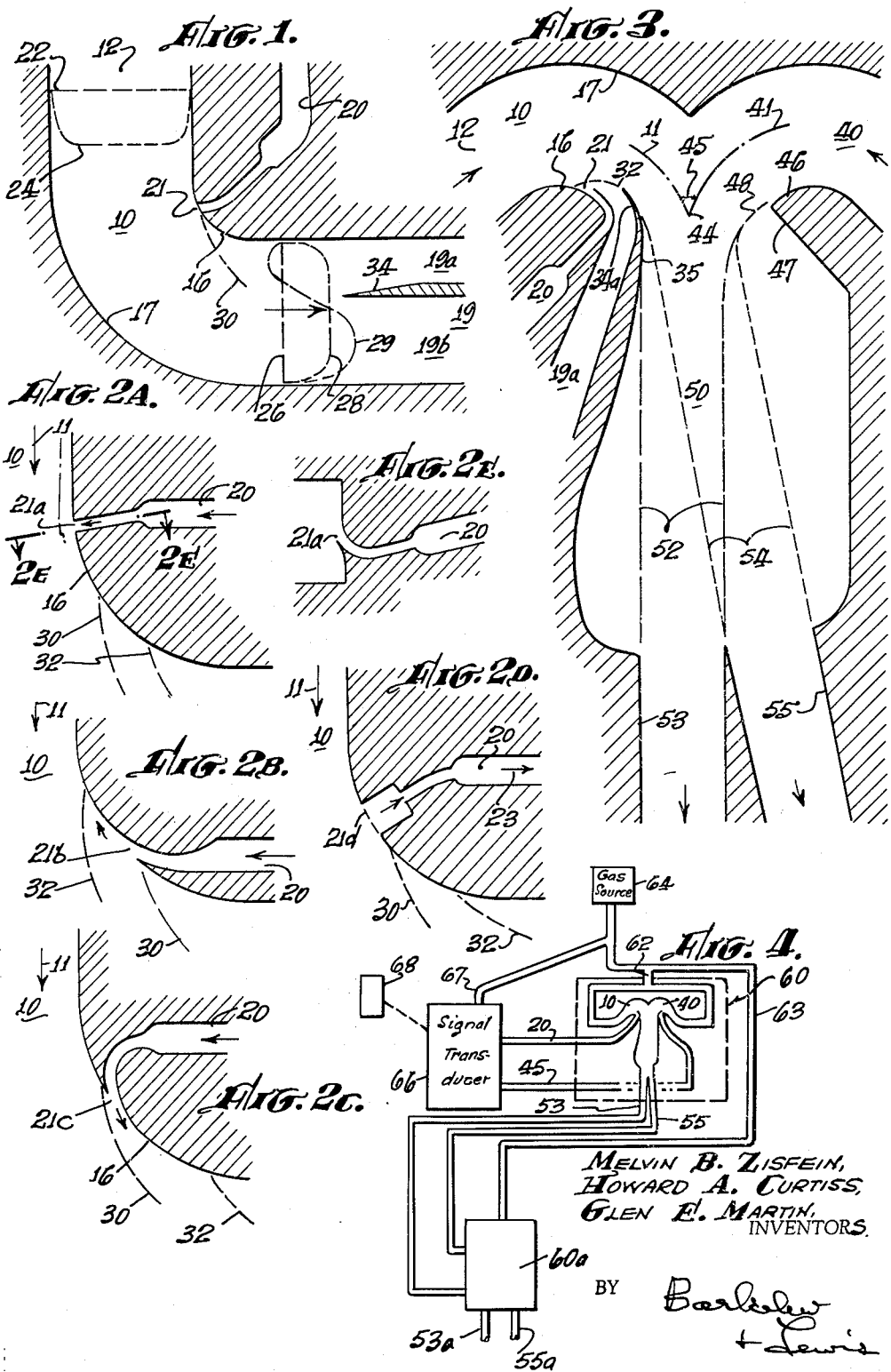

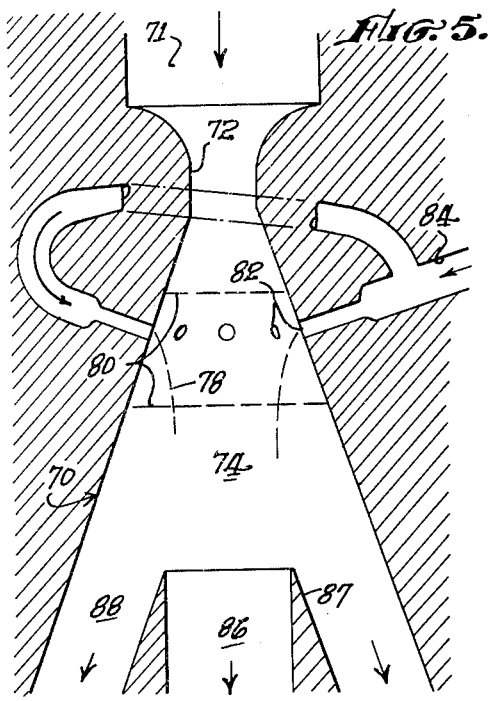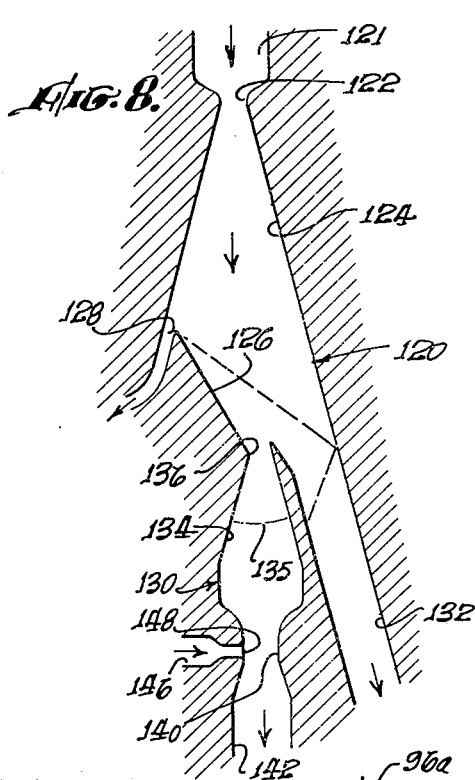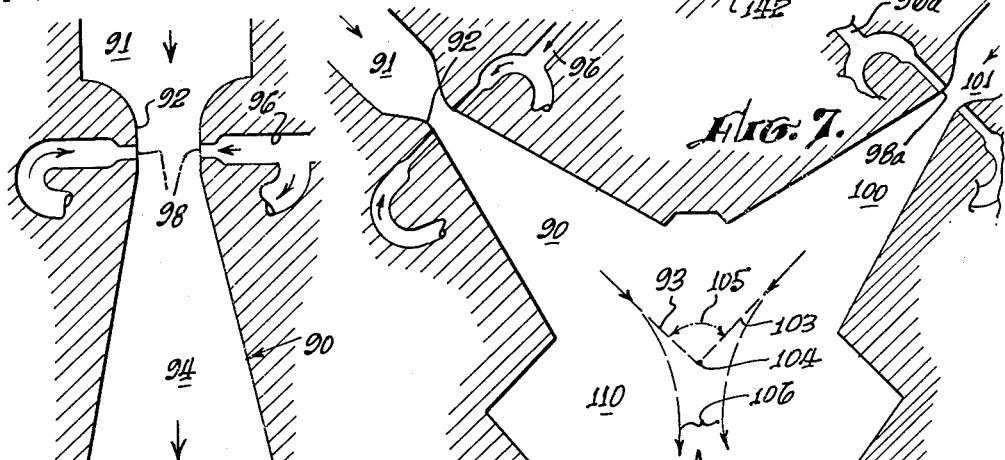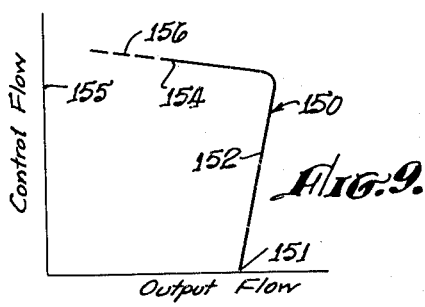

3,212,515
FLUID AMPLIFIER
Melvin B. Zisfein, Rosemont, Howard A. Curtiss, Malvern, and Glen E. Martin, Broomall, Pa., assignors to Giannini Controls Corporation, Duarte, Calif., a corporation of New York
Filed July 13, 1962, Ser. No. 209,627
26 Claims. (Cl. 137—81.5)

This invention has to do with systems for amplification of fluid flow, whereby a power stream containing relatively high energy is modulated in accordance with variations of flow of a relatively low energy control stream.

The invention is particularly concerned with systems which obtain such amplification without the use of valves, pistons or other mechanical moving elements. Such systems will be referred to as pure fluid amplifiers.

Amplifying systems in accordance with the invention are particularly useful in servo control systems that must operate under extreme environmental conditions, such as high temperature or intense nuclear radiation, which make electrical and hydraulic amplifying systems impractical. Environments of that type are found, for example, in hypersonic vehicles such as rockets and space craft. Thus, an amplifier in accordance with the invention may utilize an input pneumatic signal derived from a pneumatic pickoff from a gyroscope, for example, and typically provides an amplified pneumatic output which may operate control surfaces of the vehicle by means of pneumatic actuators of conventional type. Alternatively, the modulated pneumatic power flow from the amplifier may control the vehicle attitude directly by means of reaction jets or by direct thrust vector control in space vehicles; or by means of nozzles associated with fixed aerodynamic surfaces for boundary layer control in vehicles having aerodynamic control surfaces.

Pneumatic amplifiers are well known in which a power stream of gas is projected into a chamber, and is deflected through a small angle by direct transverse impingement of a relatively small input or signal jet of gas. Outlet and exhaust passages are typically positioned so that one or other receives the stream preferentially, depending upon the magnitude of the deflection angle. In such devices the magnitude of the power stream deflection depends directly upon the ratio of the momenta of the control and power streams, setting a sharp limit upon the amplification factor that is obtainable.

The present invention, on the contrary utilizes known principles of fluid dynamics to provide conduit configuration such that the mass flow through a conduit exhibits singular flow behavior such as separation, blockage or shock, for example. Such behavior typically depends in a sensitive manner upon the condition of the boundary layer at a relatively small portion of the conduit surface. The control fluid stream is then typically injected into the conduit immediately adjacent that portion of the conduit surface in such a way as to modify the condition of the boundary layer in a critical manner.

The invention thus produces a relatively large energy change in the power flow in response to a change of energy in the control flow which may be extremely small. Whereas the output signal typically varies with the momentum of the input signal, as in the previous systems already mentioned, the control signal momentum does not act directly to modify the power stream configuration. Instead, the input signal is only required to produce a relatively small change in the condition of the boundary layer of the power stream. That modification of the boundary layer then produces a major change in flow characteristics of the body of the stream, due to the inherent sensitivity of the power flow system itself.

Many different types of inherent sensitivity of the power flow to boundary layer conditions may be utilized by the invention for amplifying a fluid control signal. The specific configurations to be described illustrate the invention. As will appear more fully, some of the types of sensitive flow to be described require the use of a gaseous medium, especially since they relate to critical velocities that are significant only for such media. Other types of sensitive flow occur in both liquids and gases, so that fluid amplifiers in accordance with the invention can be designed to operate with media of either type.

In accordance with one aspect of the invention, the power stream comprises a gaseous medium and is caused to flow at sonic velocity through a restricted orifice or throat, and the effective thickness of the boundary layer at the throat is caused to vary under control of the input signal. The resulting change in effective throat area produces a relatively large change in mass flow of the body of the stream, since the stream velocity does not change to compensate for the change in area as would normally be the case. That results from the known tendency of a gas stream to maintain sonic velocity at a nozzle once it is established.

In accordance with a further aspect of the invention, the power stream is conducted along a wall surface under conditions tending to cause separation from the surface. It is well known that, under such conditions of incipient separation, the occurrence of actual separation and the precise point at which such separation occurs depend in a sensitive manner upon the nature of the boundary layer. The signal flow is typically caused to enter the power stream closely adjacent the boundary layer and within or near the area of incipient separation. A relatively small amount of energy injected into the boundary layer in that way, or withdrawn from it by reverse signal flow, can typically cause a relatively large change in the degree or position of the actual separation, with resulting large modulation of the power stream energy or distribution or both.

Incipient boundary separation of a fluid stream typically occurs when a rapid stream flows around a convexly curved wall surface, such as the inner wall of an elbow, for example. For a given conduit configuration, the tendency to separation depends in known manner upon such factors as detailed conduit configuration, nature of the wall surface, velocity, density and pressure of the flowing medium, and the like. Suitable values of such variables may be computed or determined by test to provide high sensitivity of the point of separation upon the detailed condition of the boundary layer. Then, by maintaining such conditions in the power stream, a relatively small change in input signal is caused to produce a relatively large change in separation and hence in distribution of the power stream downstream of the sensitive area.

Boundary layer separation may occur under other conditions than corner flow. This is true, for example, of substantially any conduit configuration leading to rapid increase in static pressure, such as results from increasing conduit cross section in a subsonic diffuser. In an axially symmetrical subsonic diffuser, for example, separation typically occurs at a longitudinal position that depends sensitively upon the condition of the boundary layer, producing large changes in the radial distribution of the power stream downstream of that sensitive region. Control of that stream distribution can be exerted by a relatively small signal stream injected annularly near the upstream boundary of the sensitive region.

A further aspect of the invention is based on the operation of a supersonic diffuser inlet. A side leg is typically provided, opening off a supersonic diffuser below a ramp and containing a second throat forming an exit restriction below a normal shock wave. By injecting the control stream at the second throat, the effective area of that restriction may be varied in such a way as to produce a relatively abrupt change in the power flow distribution between the two legs. Maximum sensitivity is typically obtained under conditions for which a slight decrease in effective throat area just causes the normal shock wave to move upstream out of the side leg into the ramp area of the supersonic diffuser.

A further aspect of the invention provides particularly effective means for increasing the output power of a pure fluid amplifier. Two power streams of approximately equal size are caused to flow through respective inlet passages into a chamber along respective flow axes that intersect within the chamber at an angle less than 180°. The two power streams coalesce to form a combined stream which typically lies in the plane of the two inlet axes. The direction and also the transverse distribution of the combined stream in that plane depend upon the ratio of the momenta of the respective streams. At least one of the power streams is variable, typically comprising the output stream from a fluid amplifying device, which may, for example, be of the general type already described. Output means of any desired type may be provided, responsive to the direction and transverse displacement of the combined stream. For example, a splitter vane of conventional type may be utilized, with two output passages for the stream components on respective sides of the plate. The output may then be described as of push-pull type, and is particualrly well adapted for supply as input signal to a second stage of amplification.

A full understanding of the invention, and of its further objects and advantages, will be had from the following description of certain illustrative ways in which it may be carried out. The particulars of that decription, and of the accompanying drawings which form a part of it, are intended only as illustration, and not as a limitation upon the scope of the invention, which is defined in the appended claims.

In the drawings:

FIG. 1 is a schematic section representing an illustrative fluid amplifying element in accordance with the invention;

FIG. 2 consists of five parts, 2A to 2E, of which 2A to 2D are fragmentary sections at enlarged scale corresponding to a portion of FIG. 1 and illustrating modifications, and FIG. 2E is a section generally on line 2E—2E of FIG. 2A representing a modification;

FIG. 3 is a schematic section representing an illustrative fluid amplifier utilizing an element corresponding to FIG. 1;

FIG. 4 is a schematic drawing representing an illustrative pneumatic amplifying system;

FIG. 5 is a schematic section representing an illustrative pneumatic amplifier;

FIG. 6 is a schematic section representing a further illustrative pneumatic amplifying element;

FIG. 7 is a schematic section representing an illustrative penumatic amplifier utilizing an element corresponding to FIG. 6;

FIG. 8 is a schematic section representing a further illustrative pneumatic amplifier; and FIG. 9 is a graph representing an illustrative response curve for an amplifier corresponding to FIG. 8.

FIG. 1 represents in longitudinal section an illustrative conduit 10 having a wall surface at 16 that is convexly curved in the plane of the drawing, parallel to the direction of flow. A fluid power stream is injected by any suitable means at the entrance 12 of the conduit section, and leaves at outlet 19. The conduit cross section may be substantially any form, but will be assumed for clarity of description to be rectangular. The flow distribution of the power stream across the width of the conduit in the plane of the drawing at the base line 22 can be represented graphically, as by the curve 24, whose distance from the base line corresponds to the stream velocity at each point of the section. Curve 24 represents typical normal velocity distribution of the inlet stream. Curve 28 similarly represents by its distance from the base line 26 typical velocity distribution of the outlet stream for flow at relatively low velocity.

As the flow velocity is increased, a point is reached at which the power stream tends to separate from the wall surface at the region of convex curvature 16, or immediately downstream of that region. Such separation is indicated schematically by the line 30. In presence of such separation, the velocity distribution at the outlet of the conduit section is modified radically, as shown illustratively by the curve 29, producing relatively high velocity adjacent the outer wall 17 of the elbow, and relatively low, or even reverse, velocity adjacent the inner wall downstream of the sensitive region 16. The precise form of distribution curve 29 depends in a sensitive manner upon the position at which separation takes place.

Output mechanism of any desired type may be employed to provide an output stream that varies in response to that variation in velocity distribution. For example, a splitter vane may be inserted in the outlet, as indicated schematically at 34, dividing the outlet stream into two portions, 19a adjacent the inner wall and 19b adjacent the outer wall of the elbow. The ratio of momenta in the streams 19a and 19b is then radically altered in response to changes in the separation characteristics, as may be seen clearly from a comparison of curves 28 and 29. Either one of the streams 19a or 19b may be used as output signal; or both streams may be employed as output, providing an output of push-pull form.

That type of sensitivity of the mass flow to the boundary layer condition is utilized by the present invention by providing a control passage that opens into conduit 10 closely adjacent the convex wall surface 16. Depending upon the mode of control used, the control stream may be introduced either upstream, downstream or at the point of incipient separation. Such a control passage is shown schematically at 20 in FIG. 1, with control orifice 21. A relatively small energy flow in either direction through that orifice typically produces a relatively large change in the boundary layer energy, and hence in the position at which separation takes place. In fact, such control flow may well alter the flow in the body of the conduit between a condition of separation and a condition of no separation. The resulting variation in the output, typically the variation in ratio of flows 19a and 19b, responds directly to changes of control flow, but with greatly amplified power.

FIG. 2 illustrates the wide variety of detailed manners in which the control stream can be injected into the boundary region of the power stream adjacent the sensitive portion of the boundary layer. In FIG. 2A the control stream is injected in a plane transverse of the direction of flow of the power stream and substantially perpendicular thereto.

The control stream may be substantially perpendicular to the main conduit wall or may be so directed as to have a large component parallel to the wall, that is, perpendicular to the paper in FIG. 2A. The latter type of injection is further illustrated in FIG. 2E, and will be referred to for convenience of reference as tangential flow, since it is substantially tangential to the conduit wall in a plane perpendicular to the direction of power flow. When the control flow is as shown in FIG. 2A or 2E, the corner design of the main conduit is typically such as to achieve beside the inner wall a laminar boundary layer that normally undergoes laminar separation at some point downstream of the control area, as indicated at 30 in FIG. 2A. In the presence of the control flow, the boundary layer is "tripped" prematurely to become turbulent, causing the separation to be delayed until further downstream, as indicated illustratively at 32. A large output signal can be obtained by locating the upstream edge of splitter plate 34 of FIG. 1 adjacent the normal separation line 30. The same technique illustrated in FIG. 2A or 2E can also be employed to promote earlier separation when the normal flow conditions of the entering power stream are such as to make the boundary layer beside the inner wall turbulent.

In FIG. 2B the control flow is directed upstream into the boundary layer, tending to reduce the energy of the boundary layer and cause premature separation of the main stream from the inner conduit wall. Thus, if the normal condition with zero control flow is such as to cause separation as indicated at 30, the separation in presence of control flow is typically moved upstream to such a point as is indicated at 32.

FIG. 2C shows the opposite relation to FIG. 2B, with the control flow directed downstream into the boundary layer. With that configuration, energy is added by the control stream to the boundary layer, tending to stabilize it and move the point of separation downstream, as from 30 to 32.

A comparison of FIGS. 2B and 2C brings out a particularly convenient feature of the present aspect of the invention, in that a positive flow of the signal stream may be caused to alter the distribution of the power stream in either direction, according to the configuration of the control orifice.

FIG. 2D represents a configuration by which fluid is withdrawn from the boundary layer by the control stream, as indicated by the arrow 23, thus delaying separation. As before, the line 30 represents an illustrative separation condition in absence of control flow. In presence of control flow in the reverse direction, the separation is typically shifted to 32.

Whereas relatively large shifts in separation behavior are indicated in FIGS. 2A to 2D for clarity of illustration, it is to be understood that such shifts are typically proportional to the energy of the control flow, so that the position of separation shifts continuously throughout a finite range. On the other hand, by utilizing a control stream of sufficient energy, separation may be entirely suppressed at one end of the control range and be present at the other end.

FIG. 3 represents in section an illustrative amplifying stage, utilizing an amplifying element of the general type illustrated in FIGS. 1 and 2B. Two power flow passages 10 and 40 open into a chamber 50 with respective axes indicated at 11 and 41 which interset at 44 within the chamber at an angle 45 which is represented illustratively as an acute angle approximating 45°. However, the angle of intersection of the passage axes is difficult to define precisely, due to the curvature of the passages as they enter the chamber. As shown here, both passages have convex inner walls 16 and 46, respectively at which incipient separation may occur. However, auxiliary flow passage 40 can have any shape as long as it supplies a directed flow to the intersection 44. A control orifice 21 is provided for modifying the boundary layer in the vicinity of the incipient separation in at least one of the power flow passages, being shown illustratively in passage 10 only. Similar control, or means for providing opposite control, may be provided, if desired, for the other passage also. A variable fluid control stream is supplied to orifice 21 via control conduit 20 from any suitable source. As illustrated, a splitter vane 34a is positioned in passage 10, in the manner already described in connection with vane 34 of FIG. 1. Vane 34a forms an exhaust passage or gutter 19a, from which gas is typically discarded to a low pressure sump. The splitter vane 34a may be contoured to provide an additional region of separated flow on the face in chamber 50, as at the region indicated at 35, for example.

In typical operation of the amplification stage of FIG. 3, fluid power streams from a suitable pressure source are caused to flow through passages 10 and 40. It is often desirable to stabilize the conditions of flow in auxiliary passage 40, as by contouring the wall as indicated at 47. In power passage 10 under conditions of zero control flow at orifice 21, separation, if present, typically occurs late enough so that a portion of the initial power stream enters the gutter 19a and is withdrawn from the main stream. The remainder of the main stream combines with the auxiliary power stream from passage 40 to form in chamber 50 a combined power stream in substantially the position indicated schematically at 52. The direction and transverse position of that combined stream are such that substantially the whole of it can enter exhaust passage 53.

In presence of a control stream emitted from orifice 21, the main power stream separates prematurely from the inner passage wall 16, an illustrative line of separation being indicated schematically at 32. That separation modifies the velocity distribution of the power stream across the passage, and may carry substantially the whole of the flow around splitter vane 34a into chamber 50. The greatly increased momentum of the power stream from passage 10, as compared with that from passage 40, as well as the altered distribution, cause the combined stream to be displaced to substantially the position indicated at 54. Thus substantially the whole of the combined stream can be received by outlet passage 55.

For intermediate flow values of the control stream, the combined power stream is divided in various intermediate ratios between the two outlet passages 53 and 55, typically, but not necessarily, exhibiting substantially proportional response to the control. The flow from either one of those passages may be utilized as the amplifier output, or both flows may be utilized. The inverse relationship between the modulation of the two output streams 53 and 55 may be convenient for many control purposes, for example for boundary layer control on two opposite faces of an aerodynamic control element. That inverse relation is also useful when the output power streams are to be used as input signals of push pull type to a second stage of amplification. Such a second stage may, for example, be similar to the stage shown in FIG. 3, but with passage 40 provided with control orifice and splitter vane structure similar to orifice 21 and vane 34a of passage 10.

FIG. 4 represents in schematic form an illustrative amplification system. The numeral 60 represents a single stage amplifier, which may typically be of the type shown in FIG. 3, except that the stage of FIG. 4 is shown as a push pull amplifier with control orifices associated with both power flow passages 10 and 40. Both power streams are preferably supplied via a common supply conduit 62 from a suitable source of gas under pressure, indicated schematically at 64. That source may constitute a hot gas generator of known type, for example, or may comprise means for withdrawing gas from the jet exhaust of the vehicle power plant. Means of conventional type for eliminating impurities from the gas and for regulating its pressure, temperature and flow in a suitable manner, may be considered to be incorporated as a part of source 64.

Control flow signals for the respective legs of amplifier 60 are supplied via conduits 20 and 45 from a single generator or transducer indicated schematically at 66. Transducer 66 is typically supplied with gas power from source 64, as via the line 67, and is typically controlled in operation by the control mechanism 68. Mechanism 68 may represent a gyroscope responsive to the attitude of a space vehicle, for example, transducer 66 providing to lines 20 and 45 a pneumatic signal of push pull type representing the gyro position. Element 60a of FIG. 4 represents schematically a second stage of amplification, which may be similar in general structure to stage 60. Stage 60a receives pneumatic power from source 64 via the line 63. It receives input control signals from output passages 53 and 55 of stage 60. Second stage output passages are represented at 53a and 55a, and typically contain pneumatic power flows which are modulated in opposite phase in accordance with the initial signal from transducer 66.

The structure represented in FIG. 5 illustrates the fact that the invention may utilize incipient separation sensitive to boundary layer conditions occurring even in absence of any convex wall surface. In the present instant, such separation is produced in a conduit of increasing area acting as a subsonic diffuser. The power flow enters conduit 70 at 71, is accelerated in the throat 72, and is decelerated in the expanding diffuser formation indicated at 74. The rapid increase of static pressure in region 74 due to the decrease in stream velocity tends to produce separation from the wall, as indicated schematically at 78. In a conduit of conical form the region of incipient separation is a circular zone of the wall surface, as indicated schematically at 80. It is not necessary that these elements be conical, but they are so described herein for definiteness of illustration. The exact point of separation typically shifts longitudinally in the diffuser in response to small changes in the condition of the boundary layer.

In accordance with the invention, the boundary layer is modified under control of a gaseous control stream by injecting the control stream or withdrawing it at a control orifice that is of substantially annular form in the immediate vicinity of surface zone 80. As illustrated, the circular array 82 of angularly spaced control orifices is supplied in parallel from control conduit 84 and acts essentially as an annular orifice. Whereas the orifices 82 are represented as transverse, they may be directed in any desired manner, as illustratively shown in FIG. 2, for example, to obtain the desired detailed action. In particular, the orifices may have a large tangential component, as represented for a rectangular conduit in FIG. 2E.

Downstream of sensitive zone 80, conduit 70 is typically divided by the circular splitter structure 87 into two outlet passages positioned to receive the power stream preferentially under different conditions of separation. The central outlet passage 86 receives the stream preferentially when separation occurs relatively far upstream; while annular outlet passage 88 receives a major fraction of the stream when separation is delayed or suppressed. The flow in one or both of these outlet passages may be utilized as amplified output signal, responsive to variations in control stream 84.

The structure of FIG. 6 employs a substantially sonic throat, and obtains control by means of a distinct type of boundary layer sensitivity. The power flow enters conduit 90 at 91, and passes at sonic velocity through the throat 92, which is illustratively represented as of rectangular section. The flow in the expanding portion of the conduit at 94 may be either subsonic or supersonic. The present embodiment of the invention depends upon the fact that, once sonic velocity is established at a well-defined throat, it tends to be stably maintained despite relatively large changes of mass conditions either upstream or downstream of the throat area. Any change in the effective area of the throat therefore produces a substantially proportional change in the mass flow, since the area change is not compensated by a change of velocity. The effective area of the sonic throat can be modified with relatively little expenditure of energy by introducing a virtual obstacle in the form of variable control flow which is directed into the sensitive boundary layer region adjacent the nozzle wall. In FIG. 6 the control conduit 96 communicates with that boundary layer region via the two opposite orifices 98. Increasing control flow into the nozzle increases the effective thickness of the boundary layer, reducing the power flow in conduit 90. In a throat of circular section an effectively continuous annular array of orifices is preferably provided, as in FIG. 5.

FIG. 7 represents an illustrative pushpull amplifier stage, utilizing an amplifier element of the type shown in FIG. 6 and employing the principle of balanced power streams that has already been described in connection with FIG. 3. Two power streams enter chamber 110 via the conduits 90 and 100, respectively, each of which contains an apertured sonic nozzle structure and expanding section. Control apertures 92 in conduit 90 are supplied with control fluid flow via the line 96, control apertures 92a in conduit 100 via the line 96a. Means of any desired type may be employed for supplying oppositely variable control streams to the respective lines 96 and 96a. The two conduit axes 93 and 103 intersect within the chamber at 104, forming an angle 105 of approximately 90°. The two power streams effectively coalesce to form a combined stream at 106. The transverse position and also the direction of that combined stream respond in a sensitive manner to variations in the ratio of momenta of the two power streams. Typical output means responsive to such variations comprise the splitter vane 112 defining the two outlet passages 114 and 116. A control conduit is shown at 96, associated with the power stream 90 in the manner already described in connection with FIG. 6. Similar control mechanism may be provided also for power stream 100, as indicated at 96a, the two power streams then typically being modulated in opposite phase.

Whereas FIG. 7 shows only two power stream conduits for clarity of illustration, three or more such streams may be provided, typically intersecting at a common point, and each of the streams may be provided with suitable control orifice structure. The respective streams, whether two or more in number, may all have the same type of control orifice arrangement; or they may differ in form and utilize different control techniques. In general, any of the amplifying elements herein described may be combined in a balanced power stream amplifier of the general type described in connection with FIGS. 3 and 7.

FIG. 8 represents a further modification of the invention wherein the control flow is introduced at a throat or nozzle. The power flow enters conduit 120 at 121. It passes through first nozzle 122 at sonic velocity and expands at supersonic velocity in the expansion nozzle portion 124, typically attaining a velocity in the neighborhood of Mach 2. A ramp area is provided at 126 with a boundary layer bleed-off incorporated ahead of the ramp at 128 to increase the effectiveness. A portion of the supersonic stream is diverted into the side leg 130, the remainder of the power stream entering the exhaust conduit 132. Leg 130 contains a region 134 in which the stream is slowed to subsonic velocity through a normal shock indicated schematically at 135. The flow then passes through the second throat region 140 to output passage 142. Control is exerted at throat 140 via the control conduit 146 and orifice 148, which may have any desired detailed form as discussed in connection with previously described embodiments of the invention.

The described unit functions in a manner similar to a supersonic inlet and combuster, where the control signal at orifice 148 produces the equivalent of a combuster by blocking the exit restriction 140. The curve 150 in FIG. 9 represents illustrative response behavior of the flow in output conduit 142 as a function of control flow in line 146. For zero control flow, the output flow is typically large, as represented at the point 151. As the control flow increases progressively up to the value indicated at 155, the output restriction becomes progressively blocked, causing the shock wave 135 to move upstream toward the mouth 136 of leg 134. The pressure loss at the shock is thereby progressively reduced, causing a gradual and relatively slight increase in the flow through second nozzle 140, as indicated by the nearly vertical portion 152 of curve 150. Above the critical value 155 of control flow, the internal normal shock wave 135 moves out of inlet 136 into the ramp area, permitting air spillage into the right leg 132 and sharply reducing the flow at output 142, as represented by the nearly horizontal portion 154 of curve 150. The dashed portion 156 of curve 150 represents a region of potential instability in which oscillations typically appear in the flow pattern. However, the stable portion of the response curve permits the production of a large power response at a predetermined level of the control signal flow. Non-linear output response of that type is particularly useful for many types of servo operation.

We claim:

1. A pure fluid amplifier comprising in combination structure forming a substantially smoothly continuous wall surface having at least a longitudinally intermediate portion that is convexly curved, means for moving a fluid power stream longitudinally of the wall surface under flow conditions causing the stream to be attached to the wall surface at a region upstream of and contiguous with said intermediate portion and to separate from the wall surface at a position within said intermediate portion by virtue of the convex curvature thereof, said power stream flowing under conditions of incipient separation from the surface in a region of the surface adjacent said position of separation, structure forming a control passage that opens into the power stream closely adjacent said region of incipient separation and downstream of said region of attachment, means for moving a variable fluid control stream through the passage and for varying the control stream continuously within a predetermined working range to modify the power stream energy at the wall surface and thereby to displace said position of separation longitudinally of the surface, the variations of said position of separation corresponding continuously to the variations of the control stream throughut said working range, and output conduit means downstream of said region of incipient separation for receiving a portion of the power stream that varies substantially continuously with the actual position of said separation.

2. A pure fluid amplifier comprising in combination structure forming a substantially smoothly continuous wall surface having at least a longitudinally intermediate portion that is convexly curved, means for moving a fluid power stream longitudinally of the wall surface under flow conditions causing the stream to be attached to the wall surface at a region upstream of and contiguous with said intermediate portion and to separate from the wall surface at a normal position within said intermediate portion by virtue of the convex curvature thereof in absence of the following defined control stream, said power stream flowing under conditions of incipient separation from the surface in a region of the surface immediately upstream of said position of separation.

structure forming a control passage that opens into the boundary layer of the power stream in a direction substantially opposite to the direction of flow thereof at a point closely adjacent said region of incipient separation and downstream of said region of attachment, means for injecting through the passage into the boundary layer of the power stream a fluid control stream that is variable within a predetermined working range to variably reduce the energy of said boundary layer and thereby to displace said separation upstream from said normal position by a distance that varies continuously with variations of the control stream throughout said working range thereof, and output conduit means downstream of said region of incipient separation for receiving a portion of the power stream that varies substantially continuously with the actual position of said separation.

3. A pure fluid amplifier comprising in combination structure forming a substantially smoothly continuous wall surface having at least a longitudinally intermediate portion that is convexly curved, means for moving a fluid power stream longitudinally of the wall surface under flow conditions causing the stream to be attached to the wall surface at a region upstream of and contiguous with said intermediate portion and to separate from the wall surface at a normal position within said intermediate portion by virtue of the convex curvature thereof in absence of the following defined control stream, structure forming a control passage that opens into the boundary layer of the power stream in substantially the direction of flow thereof at a point downstream of said region of attachment, means for injecting through the passage into the boundary layer of the power stream a fluid control stream that is variable within a predetermined working range to variably increase the energy of said boundary layer and thereby to displace said separation downstream from said normal position by a distance that varies continuously with variations of the control stream throughout said working range thereof, and output conduit means downstream of said variable position of separation for receiving a portion of the power stream that varies substantially continuously with the actual position of said separation.

4. A pure fluid amplifier comprising in combination structure forming a conduit having a portion that is bounded by a smoothly curved conduit wall with a convexly curved wall surface on one side and an opposing concavely curved wall surface on the other side, means for moving a fluid power stream through the conduit under flow conditions producing incipient separation of the power stream from the convexly curved wall surface by virtue of the convex curvature thereof, structure forming a passage that opens into the power stream closely adjacent the convexly curved wall surface, means for moving a variable control stream through the passage to control the position of actual stream separation from the convexly curved wall surface, and output conduit means for receiving a portion of the power stream that varies with the position of the actual stream separation from the convexly curved wall surface.

5. A fluid amplifier as defined in claim 4, and wherein said passage opens into the conduit in a direction transverse of the conduit wall, whereby the control stream induces turbulence in the power stream.

6. A fluid amplifier as defined in claim 4, and wherein said passage opens into the conduit in a direction essentially opposite to the direction of the power stream flow, whereby the control stream reduces the energy of the boundary layer of the power stream, thereby promoting earlier stream separation.

7. A fluid amplifier as defined in claim 4, and wherein said passage opens into the conduit in a direction essentially parallel to the power stream flow, whereby the control stream increases the energy of the boundary layer of the power stream, thereby delaying stream separation.

8. A fluid amplifier as defined in claim 4, and wherein said passage opens into the conduit closely adjacent the wall thereof and substantially parallel to said wall and transverse of the power stream.

9. A fluid amplifier as defined in claim 4, and wherein the conduit configuration is such that said flow conditions produce stream separation from the convexly curved wall at a point which varies continuously longitudinally of the conduit in response to small changes in the energy of the stream boundary layer within said region.

10. A pure fluid amplifier as defined in claim 4, and wherein the width of the conduit between said convexly curved wall surface and said opposing concavely curved wall surface is essentially uniform longitudinally of the conduit.

11. A pure fluid amplifier as defined in claim 4, said output conduit means comprising a splitter vane mounted generally parallel to said convexly curved wall surface and spaced therefrom downstream of the region of said incipient separation and dividing the conduit laterally into two portions, and structure forming two outlet passages communicating with said respective portions of the conduit.

12. A pure fluid amplifier comprising in combination structure forming a conduit having a portion that is bounded by a substantially continuous, smoothly curved conduit wall with a convexly curved wall surface on one side and an opposing concavely curved wall surface on the other side, means for moving a fluid power stream through the conduit under conditions producing incipient separation of the power stream from the convexly curved wall surface by virtue of the convex curvature thereof, means for controllably modifying the power stream flow within the boundary layer adjacent the convexly curved wall surface to vary the position of the actual stream separation therefrom, and output conduit means for receiving a portion of the power stream that varies with the position of actual stream separation from said convexly curved wall surface.

13. A pure fluid amplifier comprising the combination of structure forming a chamber having a main passage opening into the chamber along a passage axis, said passage having a curved portion with opposing convex and concave walls adjacent the chamber, structure forming a discharge passage opening outwardly from the main passage through said convex wall thereof, means for moving a fluid power stream through the main passage toward the chamber, continuously variable fluid control means energizable to engage the power stream within the main passage and to cause a variable portion of the power stream to be diverted into the discharge passage, the remainder of the power stream entering the chamber with a mass flow that varies with the control means energization, structure forming an auxiliary passage opening into the chamber along an axis that transversely intersects the main passage axis within the chamber, means for moving an auxiliary fluid power stream through the auxiliary passage into the chamber to form with the first said power stream a combined stream within the chamber, the direction of the combined stream varying continuously with said variations in the mass flow of the first said power stream, and output structure for receiving a portion of the combined stream that varies continuously with the direction thereof.

14. A pure fluid amplifier as defined in claim 13, and wherein said auxiliary passage has a curved portion with opposing convex and concave walls adjacent the chamber and has an auxiliary discharge passage opening outwardly therefrom through the convex wall thereof, and including also continuously variable auxiliary fluid control means energizable to engage the auxiliary power stream within the auxiliary passage and to cause a variable portion of the auxiliary power stream to be diverted into the auxiliary discharge passage, the remainder of the auxiliary power stream entering the chamber wtih a mass flow that varies with the auxiliary control means energization, energization of the two said control means in like phase producing opposite changes of direction of the combined power stream, and means for energizing the two said fluid control means simultaneously in opposite phase.

15. A pure fluid amplifier comprising the combination of means for producing a main fluid power stream normally flowing along a stream axis, continuously variable fluid control means energizable to produce essentially proportional variations in the power stream distribution transversely of the axis, splitter means for drawing off a portion of the power stream that varies with said transverse distribution, means for producing an auxiliary power stream that impinges transversely upon the remaining portion of the main power stream and that coalesces therewith to form a combined power stream having a direction that varies continuously in response to variations of said remaining portion, and output structure for receiving a portion of the combined power stream that varies continuously with the direction thereof.

16. A pure fluid amplifier as defined in claim 15, and wherein said means for producing an auxiliary power stream comprise conduit structure opening into the main power stream and having a conduit axis that transversely intersects the axis of the main power stream, and means for moving an auxiliary power stream through said conduit structure with flow rate and transverse distribution essentially uniform in time.

17. A pure fluid amplifier comprising the combination of means for producing two fluid power streams, two continuously variable fluid control means energizable to produce essentially proportional variations in the transverse distributions of the respective power streams at respective transverse sections thereof, splitter means at said transverse section of each power stream for drawing off from that stream a portion thereof that varies with said transverse stream distribution, the remaining portion of each power stream entering the chamber with a mass flow that varies with the control means energization, the said means for the respective streams being so mutually oriented that said remaining portions of the two power streams impinge transversely upon each other downstream of the splitter means and coalesce to form a combined power stream having a direction that varies continuously in response to variations in the mass flow of each of said remaining portions, and output structure for receiving a portion of the combined power stream that varies continuously with the direction thereof.

18. A pure fluid amplifier as defined in claim 17, and wherein energization of the two said control means in like phase produces opposite changes of direction of the combined power stream, and including means for energizing the two said fluid control means simultaneously in opposite phase.

19. A pure fluid amplifier comprising in combination structure forming a convexly curved wall surface, means for moving a fluid power stream along the wall surface under flow conditions producing incipient separation of the power stream from the wall surface by virtue of said convex curvature thereof, structure forming a passage that opens into the power stream closely adjacent the wall surface, means for moving a variable control stream through the passage to modify the power stream energy at the wall surface and thereby control the position of actual stream separation from the wall surface, means for producing an auxiliary power stream that impinges transversely upon the first said power stream on the side thereof opposite to said wall surface downstream of said passage opening, said two power streams coalescing to form a combined power stream having a direction that varies continuously with the position of actual separation of the first said power stream from the wall surface, and conduit structure for receiving a portion of the combined power stream that varies continuously with the direction of that stream.

20. A pure fluid amplifier as defined in claim 19, and including also splitter means for drawing off a portion of the first said power stream between the opening of said passage and the point of impingement of the auxiliary power stream, said portion that is drawn off varying with said position of actual stream separation from the wall surface.

21. A pure fluid amplifier as defined in claim 20, and wherein said splitter means comprise a splitter vane generally parallel to said convexly curved wall surface and spaced therefrom downstream of the region in which actual stream separation from the wall surface normally occurs, and conduit means for removing the portion of the power stream that flows between the wall surface and the splitter vane.

22. A pure fluid amplifier as defined in claim 21, and including also structure forming a second convexly curved wall surface downstream of the splitter vane on the side thereof remote from the first said convexly curved wall surface, the curvature of said second wall surface being such that the fluid in contact therewith flows under conditions of incipient separation from that surface.

23. A pure fluid amplifier comprising in combination structure forming a conduit having a throat region and having a diffuser region of increasing cross-sectional area leading from the throat region and adapted to act as a subsonic diffuser, means for moving a fluid power stream at subsonic velocity through the conduit throat region into the diffuser region under conditions producing incipient stream separation from the conduit wall on both opposite sides of the diffuser region, structure forming passage means opening into the conduit closely adjacent the conduit wall in the diffuser region on both said sides thereof, means for moving a variable fluid control stream through the passage means to modify the boundary layer of the power stream simultaneously and essentially equally on both said sides of the diffuser and thereby control the actual separation of the power stream from the conduit wall, and output means communicating with the conduit for delivering an output stream that varies in accordance with the power stream separation.

24. A pure fluid amplifier comprising in combination structure forming a conduit of substantially circular section having a throat region and having a diffuser region of increasing cross-sectional area leading from the throat region and adapted to act as a subsonic diffuser, means for moving a fluid power stream at subsonic velocity through the conduit throat region into the diffuser region under conditions producing incipient stream separation from the conduit wall in the diffuser region, structure forming a passage that opens into the conduit closely adjacent the conduit wall in the diffuser region, means for moving a variable fluid control stream through the passage to modify the boundary layer of the power stream and thereby control the actual separation of the power stream from the conduit wall, and output means communicating with the conduit for delivering an output stream responsive to variations in the power stream separation, said control passage opening into the conduit through a mouth that is effectively annular, and said output means comprising a substantially circular coaxial splitter structure in the conduit, and structure forming two outlet passages communicating with the respective portions of the conduit radially inside and radially outside said splitter structure.

25. A pure fluid amplifier comprising in combination structure forming a conduit including a nozzle and a supersonic diffuser downstream of the nozzle and having two branches, means for moving a gaseous power stream through the nozzle and at supersonic speed into the diffuser, one of said branches including structure normally acting to slow the contained stream portion to subsonic velocity through a normal shock wave and including an apertured constriction downstream of the normal shock wave, means for injecting a variable gaseous control stream through the aperture to vary the effective area of the constriction and thereby modify the longitudinal position of the normal shock wave, and output means communicating with the conduit for delivering an output power stream responsive to variations in relative flow through said branches.

26. A fluid amplifier as defined in claim 9, and wherein variation of the control stream below a threshold value causes corresponding variation of the position of the normal shock wave within said one branch, and increase of the control stream above said threshold value causes the normal shock wave to move upstream out of said one branch.

References Cited by the Examiner

UNITED STATES PATENTS

| | | | |
|---|---|---|---|
| 2,943,821 | 7/60 | Wetherbee | 60—35.6 XR |
| 2,948,148 | 8/60 | D'Anfreville et al. | |
| 3,001,539 | 9/61 | Hurvitz | 137—83 |
| 3,001,698 | 9/61 | Warren | 137—81.5 XR |
| 3,022,743 | 2/62 | Engholdt | 103—258 |
| 3,024,805 | 3/62 | Horton | 137—81.5 |
| 3,030,979 | 4/62 | Reilly | 137—81.5 |
| 3,072,147 | 1/63 | Allen et al. | 137—597 |
| 3,080,886 | 3/63 | Severson | 137—597 |
| 3,122,165 | 2/64 | Horton | 137—81.5 |

FOREIGN PATENTS 1,278,782  11/61  France.

LAVERNE D. GEIGER, *Primary Examiner.*

UNITED STATES PATENT OFFICE
CERTIFICATE OF CORRECTION

Patent No. 3,212,515

October 19, 1965

Melvin B. Zisfein et al.

It is hereby certified that error appears in the above numbered patent requiring correction and that the said Letters Patent should read as corrected below.

Column 14, line 40, for the claim reference numeral "9" read -- 25 --.

Signed and sealed this 28th day of June 1966.

(SEAL)
Attest:

ERNEST W. SWIDER
Attesting Officer

EDWARD J. BRENNER
Commissioner of Patents